(12) United States Patent
Kollep et al.

(10) Patent No.: US 6,698,332 B2
(45) Date of Patent: Mar. 2, 2004

(54) DEVICE FOR EXTRACTING A SUBSTANCE FOR THE PREPARATION OF A DRINK

(75) Inventors: Alexandre Kollep, Lutry (CH); Daniel Fischer, Romanshorn (CH); Mischa Stieger, St.-Gallen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/084,617

(22) Filed: Feb. 28, 2002

(65) Prior Publication Data
US 2002/0121198 A1 Sep. 5, 2002

Related U.S. Application Data

(63) Continuation-in-part of application No. PCT/EP00/08189, filed on Aug. 22, 2000.

(30) Foreign Application Priority Data

Aug. 31, 1999 (EP) .............................. 99117107

(51) Int. Cl.[7] .............. A47J 31/40; A47J 31/06
(52) U.S. Cl. .............. 99/289 R; 99/295; 99/302 R
(58) Field of Search ............... 99/279, 287, 289 R, 99/295, 300, 302 R, 302 P

(56) References Cited

U.S. PATENT DOCUMENTS

| | | | |
|---|---|---|---|
| 3,260,190 A | 7/1966 | Levinson | 99/295 |
| 3,353,474 A | 11/1967 | MacCorkell | 99/281 |
| 3,470,812 A | 10/1969 | Levinson | 99/295 |
| 5,649,472 A | 7/1997 | Fond et al. | 99/295 |
| 5,762,987 A | 6/1998 | Fond et al. | 426/433 |
| 5,794,519 A | 8/1998 | Fischer | 99/295 |
| 5,826,492 A | 10/1998 | Fond et al. | 99/295 |

FOREIGN PATENT DOCUMENTS

WO    WO 94/02059    2/1994

*Primary Examiner*—Reginald L. Alexander
(74) *Attorney, Agent, or Firm*—Winston & Strawn LLP

(57) ABSTRACT

The present invention relates to a device for extracting a substance for the preparation of a drink. This device includes a first, fixed piece and a second piece that is movable relative to the first about an axis of rotation lying at the rear of the two pieces, with the front of each piece providing a cavity for the substance to be extracted. The device also includes a system for closing and opening the two pieces. This system possesses a two-armed closing lever and two traction rods. The two arms of the closing lever are arranged to rotate about a first pivot on each side of the second piece. The traction rods are arranged to rotate about a second pivot on each side of the first piece. The ends of the two arms of the closing lever and the traction rods are fixed by means of a third, movable pivot so as to interact mutually in order to cause the closing and opening of the device.

24 Claims, 3 Drawing Sheets

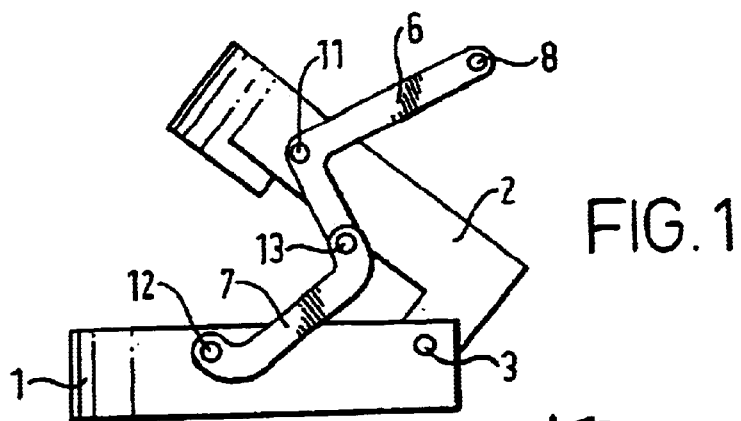
FIG. 1
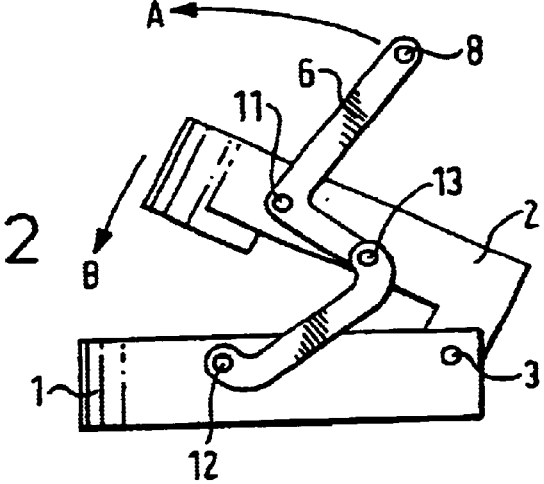
FIG. 2
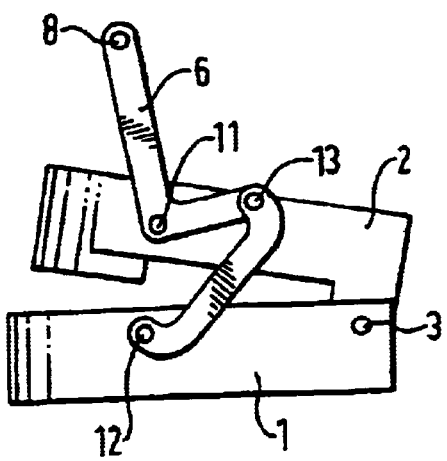
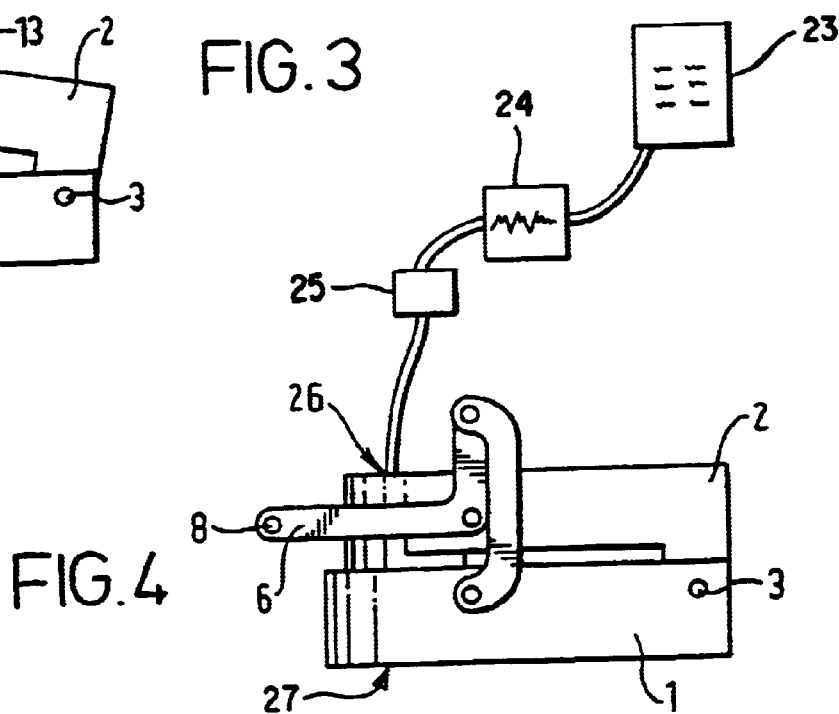
FIG. 3
FIG. 4

DEVICE FOR EXTRACTING A SUBSTANCE FOR THE PREPARATION OF A DRINK

CROSS-REFERENCE TO RELATED APPLICATIONS

The present application is a continuation-in-part of the U.S. national stage designation of International application PCT/EP00/08189 filed Aug. 22, 2000, the content of which is expressly incorporated herein by reference thereto.

TECHNICAL FIELD

The present invention relates to a device for extracting a substance for the preparation of a drink.

BACKGROUND OF THE INVENTION

A device is already known for extracting closed flexible bags containing at least one substance for the preparation of a drink. International Patent Application WO 94/02059 discloses a device comprising an upper piece equipped with means intended to perforate the upper face of the bag, a lower piece possessing elements in relief and recessed elements constituting the flow zone, and fixing means fixing the said upper and lower pieces solidly together. The problem with this device is that the lower and upper pieces are not linked together, which may cause the following problem: the movable part is lowered onto the fixed part, but it is lowered insufficiently far, which may result in the fixing means not locking the upper part/lower part assembly. This would make it impossible to extract the bags. Thus, improvements in this type device are needed.

SUMMARY OF THE INVENTION

The invention relates to a device for extracting a substance for preparing a drink, preferably for making individual cups of coffee. A preferred embodiment of the device comprises first and second support members that are pivotally connected together at a support pivot axis. The support members have an open position for receiving the substance between the support members and a closed position in which the support members cooperatively define an extraction cavity therebetween. A liquid intake is associated with the extraction cavity for feeding a liquid into the cavity for mixing with the substance to form a beverage mixture. A fluid exit is associated with the extraction cavity for extracting the mixture and is preferably disposed for extracting the mixture from below the extraction cavity. A linkage is operatively associated with the support members for moving the members relative to each other between the open and closed positions.

The linkage preferably comprises an operation lever pivotally connected to the second support member at a lever pivot axis,. The linkage also has a traction arm pivotally connected to the first support member at a traction pivot axis. The traction arm is connected to the operation lever at a connection pivot axis for controlling opening and closing movement of the support members between the open and closed positions upon movement of the operation lever. The lever is disposed on the same side of the support pivot as the extraction cavity such that both are accessible to a user from the same side.

Preferably, the extraction cavity is configured for receiving a package containing the substance and for opening the package for introducing the liquid and extracting the mixture therefrom. The linkage is configured and the pivot axes disposed such that the traction, lever, and connection pivots axes are aligned with each other at an aligned position during the opening and closing movement. With the support members in the closed position, the connection pivot axis is disposed further from the support pivot axis than a plane defined between the traction and lever pivot axes.

The preferred lever comprises a handle disposed at an angle about the lever pivot axis from the connection pivot axis. The connection pivot axis is preferably movable towards and away from the support pivot axis.

In the preferred embodiment, the support members have a front oriented in a direction extending from the support pivot axis toward the extraction cavity, and a rear oriented in an opposite direction from the front. The operation lever comprises a handle configured for operation and manipulation by a user for opening and closing the support members, with the handle being disposed in front of the extraction cavity with the support members in the closed position. The handle is disposed above the extraction cavity in with the support members in the open position, and the linkage is configured such that the handle rotates around the extraction cavity during movement of the support members between the open and closed positions. The handle is also preferably disposed in a plane extending between the extraction cavity and the support pivot with the support members in the open position. The extraction cavity has a center, and the traction and lever pivot axes are disposed behind the center of the extraction cavity.

At least one of the support members preferably includes a linkage portion that is connected to the linkage, a cavity portion defining part of the cavity in the closed position, and a spherical joint rotationally connecting the cavity portion to the linkage portion for enabling the cavity portion to rotate for receiving the substance and aligning against the other of the support members in the closed position. One of the support members also is preferably fixed against rotation.

A heater disposed upstream of the liquid intake is configured for heating the liquid, which preferably comprises water. The preferred lever comprises first and second levers pivotably connected to the second support portion at the lever pivot axis, and the traction arm comprises first and second traction arms pivotally connected to the first support member at a traction pivot axis and to the first and second levers, respectively, at the traction pivot axis.

In an embodiment of the device, a cavity portion cooperates with the first support member to define an extraction cavity therebetween with the support members in the closed position. The cavity is configured for receiving the substance with the support members in the open position. Additionally, a spherical joint rotationally connects the cavity portion to second support member for enabling the cavity portion to rotate for receiving the substance and aligning against the other of the support members in the closed position. Preferably, the extraction cavity is configured for receiving a capsule containing the substance, and the liquid intake is configured for injecting the liquid into the capsule in the extraction cavity, with the fluid exit configured for opening the capsule for extracting the beverage mixture.

BRIEF DESCRIPTION OF THE DRAWINGS

The remainder of the description is given with reference to the drawings, in which:

FIG. 1 is a lateral view of the device according to the invention in the open position, FIG. 2 is a lateral view of the device according to the invention in the process of closing, FIG. 3 is a lateral view of the device according to the invention in the process of closing, FIG. 4 is a lateral view of the device according to the invention in the closed position.

DETAILED DESCRIPTION OF THE PREFERRED EMBODIMENTS

Figure 5:
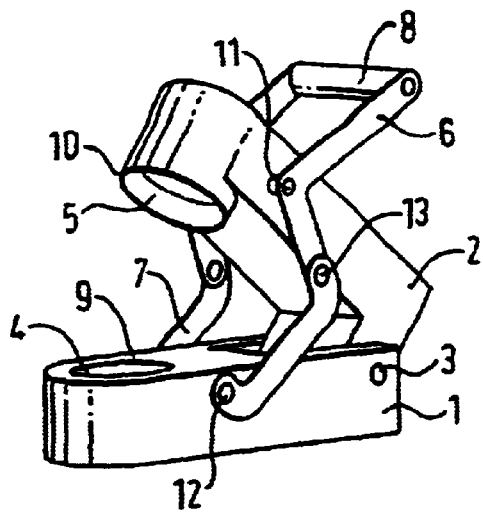
FIGS. 5, 6, 7 and 8 are perspective views of the stages of closing shown in FIGS. 1, 2, 3 and 4, and FIGS. 9 and 10 are partial sections showing the spherical joint in more detail.
Figure 6:
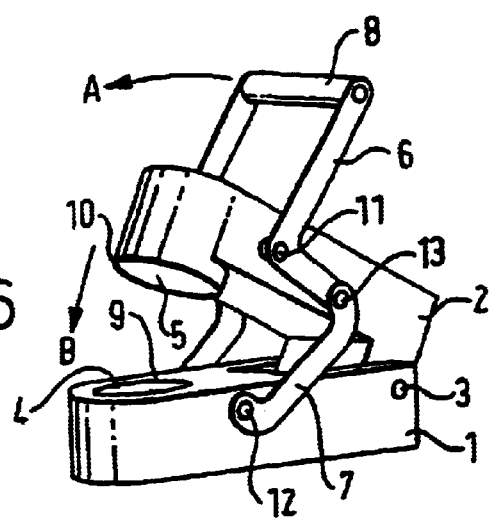
Figure 7:
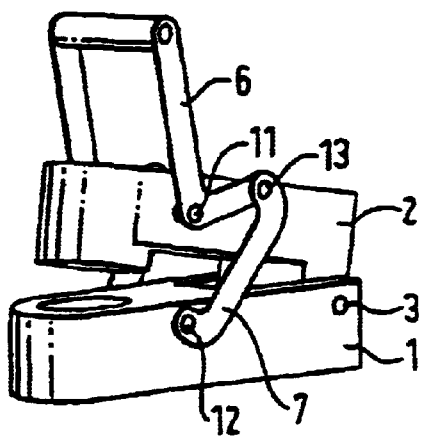

The present invention relates to a substance-extracting device for the preparation of a drink in which there is no longer any risk of absence of locking between the upper and lower pieces, so as to reliably guarantee extraction with good sealing of the substance to be extracted.

The present invention specifically relates to a device for extracting a substance for the preparation of a drink, comprising a first, fixed piece and a second piece, movable relative to the first about an axis of rotation lying at the rear of the said two pieces, the front of each piece supplying a cavity for the substance to be extracted, the said device further comprising a system for closing and opening the two pieces, the said system possessing a two-armed closing lever and two traction rods, the two arms of the closing lever being fixed to rotate about a first pivot on either side of the second piece, the traction rods being fixed to rotate about a second pivot on either side of the first piece, and the ends of the two arms of the closing lever and of the traction rods being solidly fixed by means of a third, movable pivot so as to interact mutually in order to cause the closing and opening of the device.

The value of the device according to the invention is that the first and second pieces are solidly fixed at all times, which means that, when the opening and closing system is actuated, the second, movable piece is gradually brought towards the first, fixed piece until complete locking of the two pieces relative to one another. There can be no absence of locking, or, therefore, any absence of sealing during extraction.

A cavity is provided for the substance to be extracted. This cavity may be provided in order to place therein a closed cartridge, for example a cartridge as described in EP 0 512 468 and EP 0 602 203 in the name of the applicant. There is, however, no restriction on also being able to use the device according to the invention for other closed bags, capsules or cartridges. It is also possible to use the device according to the invention for open cartridges, for example cartridges made from plastic or bags made from filter paper or from nonwovens.

The substance contained in the closed, open or other cartridge is a pulverulent or powdered substance for the preparation of a drink. This substance is preferably roasted and ground coffee, but may also be tea, instant coffee, a mixture of ground coffee and instant coffee, a chocolate-flavored product or any other dehydrated edible substance.

The description of the functioning of the device according to the invention will be explained in more detail with reference to the figures. It may however be said at this point that it operates in the following manner:

the cartridge is placed in its cavity in the first piece, which is fixed, the consumer then operates the closing system: he pulls the closing lever towards him, which raises the traction rods and lowers the second, movable piece towards the first piece. At the end of travel of the closing lever, the two pieces are in the closed position. At this point, the first, the second and the third pivots are substantially in the same vertical plane at the rear of the cavity for the substance to be extracted.

In a preferred embodiment of the device according to the invention, in the closed position of the two pieces, the third pivot connecting the two closing-lever arms and the traction rods is substantially in front of the plane formed by the other two pivots. This configuration makes it possible to guarantee beyond any doubt good securing and perfect sealing of the device according to the invention. In front of the plane formed by the other two pivots is here understood as meaning moving towards the cavity for the substance to be extracted.

There is also a risk of absence of sealing when the device according to the invention is closed, because the lower part of the cavity in the second piece is not always exactly parallel to the matching part of the first, fixed piece. To eliminate this risk, provision is made for the second, movable piece to comprise a cavity for the substance to be extracted which is movable on a spherical joint. In this embodiment, the center of the spherical joint is substantially at the center of the plane where the sealing of the cavity of the substance to be extracted takes place. It is thus possible to make good any defect of parallelism and eliminate any risk of defective sealing.

If the device according to the invention is used for the extraction of closed cartridges, it is necessary to arrange in the second, movable piece a needle allowing the entry of water and in the first, fixed piece a plate having recessed elements and elements in relief, such as those mentioned in patents EP 0 512 470 and EP 0 604 615.

A preferred embodiment comprises:

a first support member, which preferably comprises a fixed piece (1) and a second support member, preferably comprising second piece (2), movable relative to the first about an pivot axis of rotation (3) lying at the rear of the said two pieces, the front of each piece (1, 2) supplying an extraction cavity cooperatively defined by cavities (4) and (5) for the substance to be extracted, the said device further comprising a system, preferably comprising a linkage, for closing and opening the two pieces, the said system possessing a two-armed closing lever (6) and two traction rods (7).

The closing lever (6) comprises the gripping part (8) and the lever part as such which possesses an elbow having an angle of preferably around 90° to place the handle or gripping part (8) at an angle to the third pivot (13) about first pivot (11). The traction rod may be straight or, as in the figure, with inward-curving ends. The cavity (4) comprises a peripheral rim (9) and the cavity (5) a peripheral rim (10).

The two arms of the closing lever (6) are fixed to rotate about a first pivot (11) on either side of the second piece (2) and the traction rods (7) are fixed to rotate about a second pivot (12) on either side of the first piece (1). The two ends of the two arms of the closing lever, opposite the gripping part (8), and the two ends of the traction rods (7) are solidly fixed by means of a third, movable pivot (13), so that the closing lever interacts with the rods to cause the closing and opening of the device according to the invention. As shown in the drawings, the lever (6) is disposed on the same side of the pivot 3 as the extraction cavity.

Figure 8:
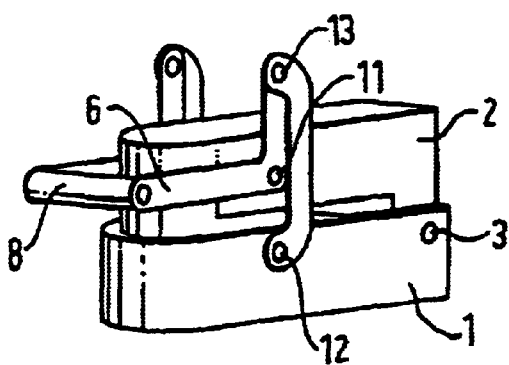
Figure 9:
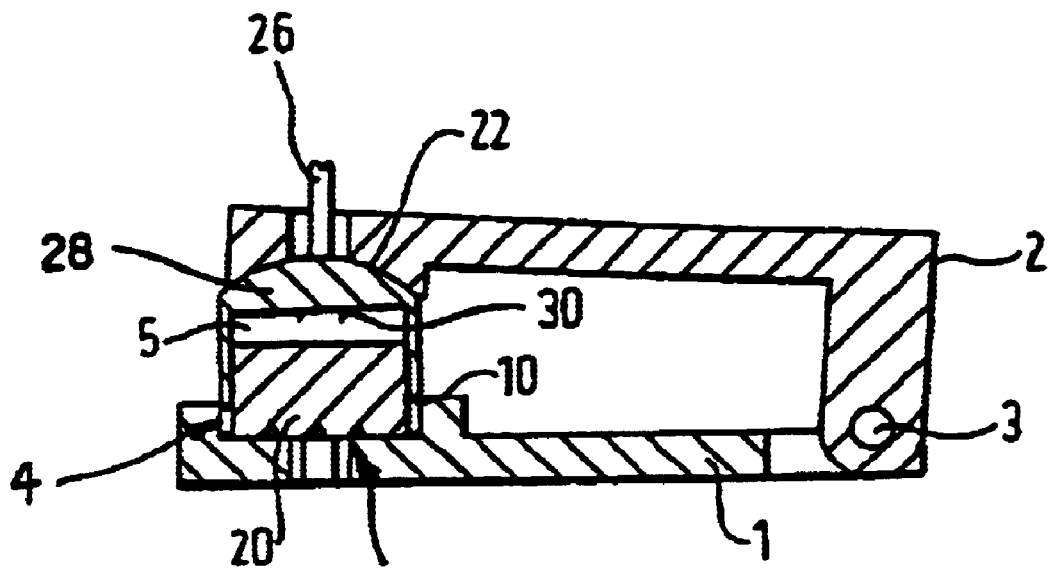

Adopting the sequences shown in FIGS. 1 to 4 and 5 to 8, the functioning of the device according to the invention is as follows:

The consumer places in the cavity (4) a capsule or cartridge to be extracted, such as cartridge 20 shown in FIG. 9, with the parts (1),(2) in an open position shown in FIGS. 1 and 5. The consumer then pulls the gripping part (8) of the closing lever (6), preferably comprising a user-operable operation-handle, forwards in the direction of the arrow A, so as to cause the said lever to rotate about its pivot (11), which then draws the traction rod (7) upwards along the pivot 13 and causes the movable part (2) to descend (arrow B) towards the fixed part (1): FIGS. 2, 3 and 6, 7. The closed position is reached when the closing lever is substantially in the horizontal position and the traction rods in the vertical position: FIGS. 4 and 8. At this point, the peripheral rims (9, 10) of the cavities (4, 5) are face to face and must ensure good sealing of the device. Preferably, the linkage is configured and the pivots disposed such that the first, second, and third pivots (11)-(13) are aligned with each other at an aligned position during the opening and closing movement of the parts (1) and (2). With the parts (1) and (2) in the closed position, the third pivot (13) is disposed further from the support pivot axis than a plane defined between the first and second pivots (11),(12). During the movement of parts (1) and (2), the third pivot (13) moves towards and away from the pivot (3).

As shown in FIGS. 1-8, the parts (1),(2) have a front oriented in a direction extending from pivot (3) toward the extraction cavity, and a rear oriented in an opposite direction from the front. The gripping part (8) is configured for operation and manipulation by a user for opening and closing the support members and is disposed in front of the extraction cavity with parts (1) and (2) in the closed position. The gripping part (8) is disposed above the extraction cavity in with the parts (1) and (2) in the open position. The linkage is configured such that the gripping part (8) rotates around the extraction cavity during movement of the parts (1) and (2) between the open and closed positions. The gripping part (8) of the embodiment shown is disposed in a plane extending between the extraction cavity and pivot (3) with the parts (1) and (2) in the open position. Pivots (11) and (12) are disposed behind the center of the extraction cavity.

The device according to the invention is incorporated into a coffee-making machine comprising conventional elements, specifically a tank (23) for the water, a heating element (24), a pump (25) for bringing the water to the cavity (5), and water intake ducts (26), preferably downstream of the heating element (24) and pump (25), for feeding the water in to the extraction cavity. These various elements are shown schematically in FIG. 4, and are independently known in the art. When the device is in the totally closed position (FIGS. 4 and 8), the pump (25) can be activated to bring the water into the cavities (4, 5): the water then flows onto and mixes with the substance to be extracted through a fluid exit (27), for example coffee, and the drink flows below the piece (1) into a cup (not shown), preferably for making individual cups of coffee.

At the end of extraction, the consumer unlocks and opens the device by raising the closing lever (6) upwards, which causes the traction rod (7) to pivot backwards about its axis of rotation (12) and raises the movable part (2). The consumer can thus remove the extracted cartridge and the device is thus ready for a repeat extraction.

Figure 10:
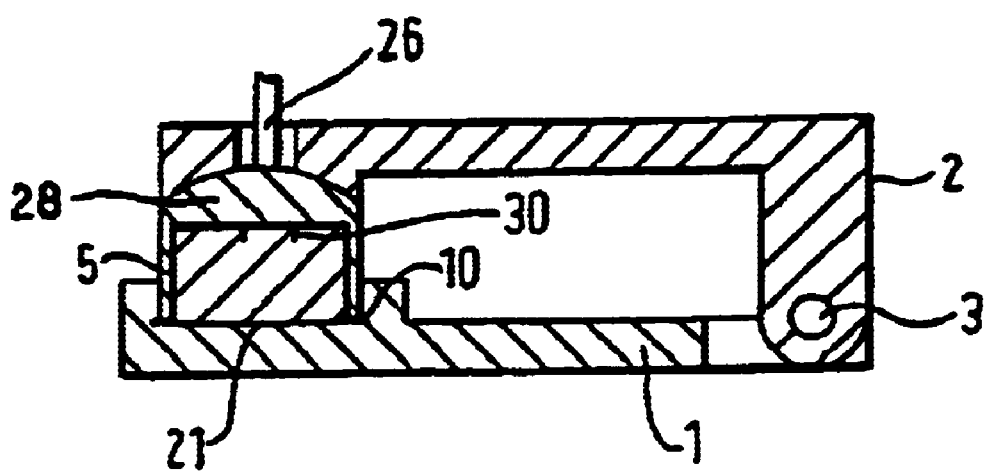

FIGS. 9 and 10 show a specific embodiment of the device according to the invention in the form of a schematic section. Part (2) possesses a cavity portion (28) defining a cavity (5) having a lower peripheral rim (10), with preferably mates with another portion of the cavity in the first part (1). The capsule or other package to be extracted is shown at (20). The cavity portion (28) with the (5) is movable on a spherical joint (22) that movably attaches cavity portion (5) to the second part (2). The center of rotation provided by the spherical joint is preferably located substantially at the mid-point between the two cavities (4, 5) or the midpoint of the height of the closed cavity. The spherical joint is preferably capable of rotation about two axes or at least two axes. When the part (2) is closed, the cavity portion (28) can shift, depending on the contours of the capsule (20), and the rim (10) adjusts to bear correctly against the rim (9) of the cavity (4).

The extraction cavity is preferably configured for opening the capsule (20) for injecting the water into the capsule and extracting the mixture, as known in the art. Preferably, the cavity portion 20 has perforation elements (30) configured for opening the capsule to inject the fluid, and the first part (1), at the bottom of the cavity (5), has raised and hollow portions (32) to extract the fluid beverage mixture. The fluid exit preferably comprises raised and hollow portions for opening the capsule (20) and extracting the fluid, as known in the art.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A beverage dispensing device for extracting a substance for preparing a beverage, comprising:
   first and second support members pivotally connected together at a support pivot axis and comprising an open position for receiving the substance between the support members and a closed position in which the support members cooperatively define an extraction cavity therebetween, the support members having a front side disposed toward the extraction cavity from the support pivot axis;
   a liquid intake associated with the extraction cavity for feeding a liquid into the cavity for mixing with the substance to form a beverage mixture;
   a fluid exit associated with the extraction cavity for extracting the mixture; and
   a linkage operatively associated with the support members for moving the members relative to each other between the open and closed positions, the linkage comprising:
   an operation lever pivotally connected to the second support member at a lever pivot axis, and
   a traction arm pivotally connected to the first support member at a traction pivot axis, the traction arm being connected to the operation lever at a connection pivot axis for controlling opening and closing movement of the support members between the open and closed positions upon movement of the operation lever,
   wherein the lever and traction pivot axes are disposed in the front side of the support pivot axis with the support members in the closed position.

2. The device of claim 1, wherein the support members are configured for receiving a package containing the substance in the extraction cavity and for opening the package therein for introducing the liquid and extracting the mixture from the package.

3. The device of claim 1, wherein the linkage is configured and the pivot axes disposed such that the traction, lever, and connection pivots axes are aligned with each other at an aligned position during the opening and closing movement.

4. The device of claim 3, wherein with the support members in the closed position, the connection pivot axis is disposed further from the support pivot axis than a plane defined between the traction and lever pivot axes.

5. The device of claim 1, wherein the lever comprises a handle disposed at an angle about the lever pivot axis from the connection pivot axis.

6. The device of claim 1, wherein the connection pivot axis is movable towards and away from the support pivot axis.

7. A beverage dispensing device of for extracting a substance for preparing a beverage, comprising:
    first and second support members pivotally connected together at a support pivot axis and comprising an open position for receiving the substance between the support members and a closed position in which the support members cooperatively define an extraction cavity therebetween, wherein the support members have a front oriented in a direction extending from the support pivot axis toward the extraction cavity, and a rear oriented in an opposite direction from the front;
    a liquid intake associated with the extraction cavity for feeding a liquid into the cavity for mixing with the substance to form a beverage mixture;
    a fluid exit associated with the extraction cavity for extracting the mixture; and
    a linkage operatively associated with the support members for moving the members relative to each other between the open and closed positions, the linkage comprising:
        and operation lever pivotally connected to the second support members at a lever pivot axis, the operation lever comprising a handle configured for operation and manipulation by a user for opening and closing the support members, the handle being disposed in front of the extraction cavity with the support members in the closed position, and
        a traction arm pivotally connected to the first support members at a traction pivot axis, the traction arm being connected to the operation lever at a connection pivot axis for controlling opening and closing movement of the support members between the open and closed positions upon movement of the operation lever;
    wherein the lever is disposed on the same side of the support pivot as the extraction cavity such that both are accessible to a user from the same side.

8. The device of claim 7, wherein the handle is disposed above the extraction cavity in with the support members in the open position.

9. The device of claim 8, wherein the linkage is configured such that the handle rotates around the extraction cavity during movement of the support members between the open and closed positions.

10. The device of claim 7, wherein the handle is disposed in a plane extending between the extraction cavity and the support pivot with the support members in the open position.

11. The device of claim 7, wherein the extraction cavity has a center, and the traction and lever pivot axes are disposed behind the center of the extraction cavity.

12. The device of claim 1, wherein at least one of the support members comprises:
    a linkage portion that is connected to the linkage,
    a cavity portion defining part of the cavity in the closed position, and
    a spherical joint rotationally connecting the cavity portion to the linkage portion for enabling the cavity portion to rotate for receiving the substance and aligning against the other of the support members in the closed position.

13. The device of claim 1, wherein one of the support members is fixed against rotation.

14. The device of claim 1, wherein the fluid exit is disposed for extracting the mixture from below the extraction cavity.

15. The device of claim 1, further comprising a heater upstream of the liquid intake and configured for heating the liquid, wherein the liquid comprises water.

16. The device of claim 1, wherein:
    the lever comprises first and second levers pivotably connected to the second support portion at the lever pivot axis; and
    the traction arm comprises first and second traction arms pivotally connected to the first support member at a traction pivot axis and to the first and second levers, respectively, at the traction pivot axis.

17. The device of claim 1, wherein the device is configured for making individual cups of coffee.

18. The device of claim 1, wherein:
    the extraction cavity is configured for receiving a capsule containing the substance;
    the liquid intake is configured for injecting the liquid into the capsule in the extraction cavity; and
    the fluid exit is configured for opening the capsule for extracting the beverage mixture.

19. A beverage dispensing device for extracting a substance for preparing a beverage, comprising:
    first and second members movably associated with each other for moving between a open and closed positions;
    a cavity portion cooperating with the first support member to define an extraction cavity therebetween with the support members in the closed position, the cavity being configured for receiving the substance with the support members in the open position;
    a spherical joint rotationally connecting the cavity portion to second support member for enabling the cavity portion to rotate for receiving the substance and aligning against the other of the support members in the closed position;
    a liquid intake associated with the extraction cavity for feeding a liquid into the cavity for mixing with the substance to form a beverage mixture; and
    a fluid exit associated with the extraction cavity for extracting the mixture.

20. The device of claim 19, wherein:
    the extraction cavity is configured for receiving a capsule containing the substance;
    the liquid intake is configured for injecting the liquid into the capsule in the extraction cavity; and
    the fluid exit is configured for opening the capsule for extracting the beverage mixture.

21. The device of claim 1, wherein the extraction cavity has a center, and the traction pivot axis is disposed substantially between support pivot axis and the extraction cavity center.

22. The device of claim 1, wherein the lever and connection axis are disposed in the front side with the support members in the closed position.

23. A beverage dispensing device for extracting a substance for preparing a beverage, comprising:
    first and second support members pivotally connected togther at a support pivot axis and comprising an open position for receiving the substance between the support members and a closed position in which the support members cooperatively define an extraction cavity therebetween;

a liquid intake associated with the extraction cavity for feeding a liquid into the cavity for mixing with the substance to form a beverage mixture;

a fluid exit associated with the extraction cavity for extracting the mixture; and a linkage operatively associated with the support members for moving the members relative to each other between the open and closed positions, the linkage comprising:

an operation lever pivotally connected to the second support member at a lever pivot axis, and a traction arm pivotally connected to the first support member at a traction pivot axis, the traction arm being connected to the operation lever at a connection pivot axis for controlling opening and closing movement of the operation lever, wherein the linkage is configured and the pivot axes disposed such that the traction, lever, and connection pivots axes are aligned with each other at an aligned position during the opening and closing movement.

24. The device of claim 23, wherein the lever is disposed on the same side of the support pivot as the extraction cavity such that both are accessible to a user from the same side.

* * * * *

UNITED STATES PATENT AND TRADEMARK OFFICE
CERTIFICATE OF CORRECTION

PATENT NO. : 6,698,332 B2  Page 1 of 1
APPLICATION NO. : 10/084617
DATED : March 2, 2004
INVENTOR(S) : Kollep et al.

It is certified that error appears in the above-identified patent and that said Letters Patent is hereby corrected as shown below:

Title Page:
Item [57] ABSTRACT, line 13, after "closing lever and the traction rods are fixed by", delete "means of".

Column 7:
Line 34, change "support members" to -- support member --.
Line 41, change "members at a traction" to -- member at a traction --.

Column 8:
Line 62, change "axis are disposed" to -- axes are disposed --.
Line 67, change "togther at a support" to -- together at a support --.

Column 10:
Line 5, after "movement of the" insert -- support members between the open and closed positions upon movement of the --.

Signed and Sealed this

Fifteenth Day of January, 2008

JON W. DUDAS
*Director of the United States Patent and Trademark Office*